United States Patent [19]

Chasse et al.

[11] Patent Number: 5,404,515
[45] Date of Patent: Apr. 4, 1995

[54] BALANCING OF COMMUNICATIONS TRANSPORT CONNECTIONS OVER MULTIPLE CENTRAL PROCESSING UNITS

[75] Inventors: Dennis W. Chasse, Litchfield, N.H.; Tommy W. Kwan, Billerica, Mass.

[73] Assignee: Bull HN Information Systems Inc., Billerica, Mass.

[21] Appl. No.: 876,676

[22] Filed: Apr. 30, 1992

[51] Int. Cl.$^6$ .................. G06F 13/14; G06F 15/16
[52] U.S. Cl. .................. 395/650; 395/200; 364/DIG. 1; 364/230.3; 364/DIG. 2; 364/942.5
[58] Field of Search .................. 395/200, 650

[56] References Cited

U.S. PATENT DOCUMENTS

| | | | |
|---|---|---|---|
| 3,702,006 | 10/1972 | Page | 364/700 |
| 4,080,649 | 3/1978 | Calle et al. | 364/200 |
| 4,403,286 | 9/1983 | Fry et al. | 364/200 |
| 4,495,570 | 1/1985 | Kitajima et al. | 364/200 |
| 4,694,396 | 9/1987 | Weisshaar et al. | 364/300 |
| 4,914,583 | 4/1990 | Weisshaar et al. | 364/200 |
| 5,109,486 | 4/1992 | Seymour | 395/200 |
| 5,168,547 | 12/1992 | Miller et al. | 395/325 |
| 5,179,702 | 1/1993 | Spix et al. | 395/650 |
| 5,185,861 | 2/1993 | Valencia | 395/200 |

Primary Examiner—Thomas C. Lee
Assistant Examiner—Fran R. Faller
Attorney, Agent, or Firm—Gary D. Clapp; John S. Solakian

[57] ABSTRACT

A communications control system in a multi-processor system includes a connection distribution data structure, including, for each central processing unit, a connection count means for storing a number representing the number of communication connections currently being executed by the corresponding central processing unit, and a gate driver interface service module. The gate driver interface service module is a single task resident in the computer system memory with an active invocation in a single central processing unit of the processing system. The gate driver interface service module responds to each request by selecting the central processing unit presently executing the least number of communication connections, and assigning the communication connection to the central processing unit for execution by constructing a corresponding control block containing the identification of the central processing unit assigned to execute the communication operation. The gate driver interface service module provides the control block to a communication controller, and the communication controller being responds to a control block for performing the requested communication operation.

9 Claims, 9 Drawing Sheets

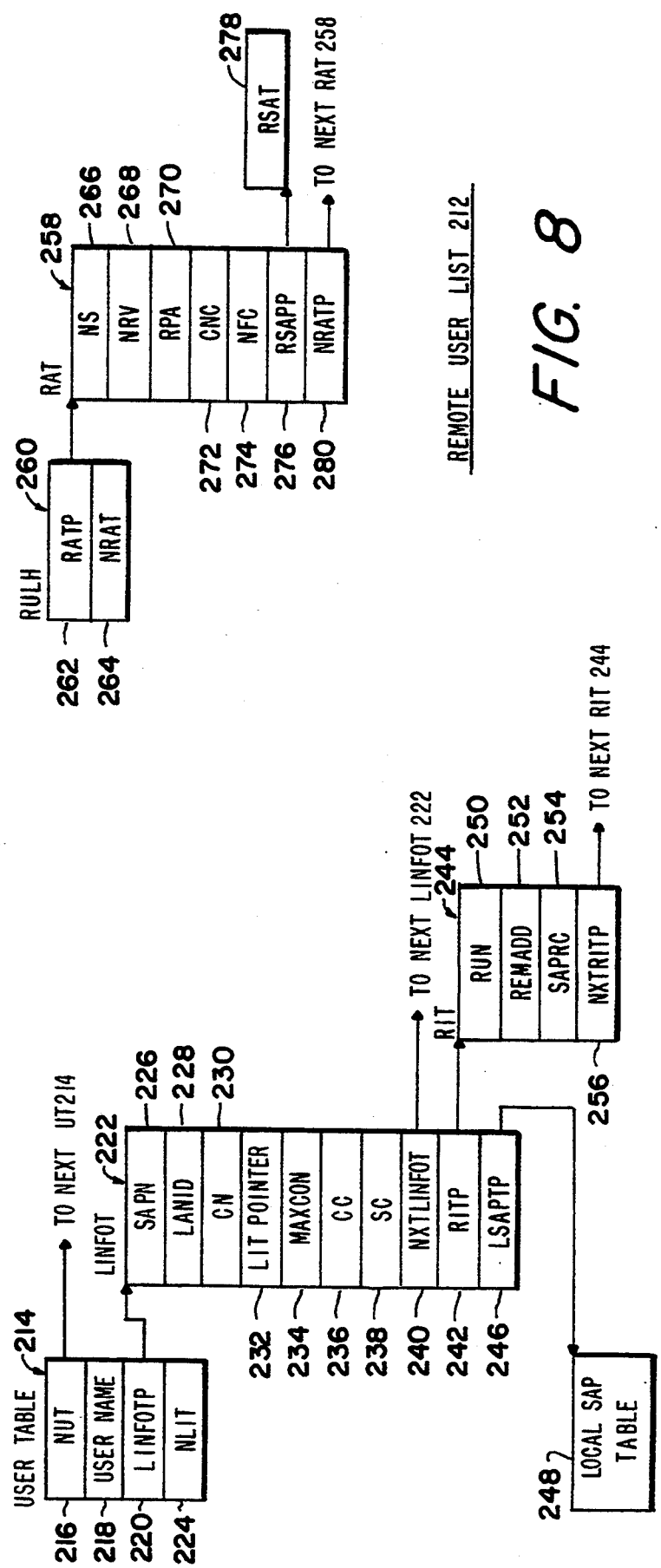

BALANCING OF COMMUNICATIONS TRANSPORT CONNECTIONS OVER MULTIPLE CENTRAL PROCESSING UNITS

CROSS REFERENCES TO RELATED PATENT APPLICATIONS

The present patent application is related to:

U.S. patient application Ser. No. 07/876,667, filed Apr. 30, 1992, for DISTRIBUTION OF COMMUNICATIONS CONNECTIONS OVER MULTIPLE SERVICE ACCESS POINTS IN A COMMUNICATIONS NETWORK by David B. Johnson, Dennis W. Chasse and Tommy W. Kwan, and assigned to the assignee of the present application now pending;

U.S. patient application Ser. No. 07/876,677, filed Apr. 30, 1992, for DISTRIBUTION OF CONTROL BLOCK QUEUING AMONG MULTIPLE CENTRAL PROCESSING UNITS by Dennis W. Chasse and Tommy W. Kwan, and assigned to the assignee of the present application now pending;

U.S. Pat. No. 4,831,518 issued May 16, 1989 to Yu et al. for MULTIPROCESSOR INTERRUPT REROUTING MECHANISM and assigned to the assignee of the present application; and, U.S. Pat. No. 4,951,245 issued Aug. 21, 1990 to Bailey et al. for NETWORK TERMINAL DRIVER COMMUNICATIONS SUBSYSTEM and assigned to the assignee of the present application.

FIELD OF THE INVENTION

The present invention relates to the management of a communications network and, more particularly, to a communications control system for distributing communications connections over multiple service access points in a multi-processor system connected in a communications network.

BACKGROUND OF THE INVENTION

Many contemporary computer systems are comprised of a number of processing systems, each having a plurality of central processing units among which the tasks to be performed by the system are divided, and wherein the processing systems are interconnected through a communications network for communication of information among the users of the systems.

A recurring problem in such systems is the management of the communications tasks, both within a given processing system and between the processing systems, as all communications operations carry with them an overhead burden resulting from the need to administer, control and keep track of communications resources and communications operations, as well as the system processor time and resources required to execute the actual communications operations. Yet another problem, which is related in part to the first problem, is the need to make optimum use of the communications resources of the systems and of the communications network connecting the systems as it frequently occurs that communications to and from one user or processing system, or between computer systems through a given path of the communications network will become saturated, thereby limiting the communications operations, while other communications resources are lightly loaded.

One approach taken to this problem has been to assign communications resources and connections to each system processing unit and to have each system processing unit administer, control and execute its own communications operations. This approach, however, has the disadvantage that a single user of a processing unit with extensive communications needs may effectively monopolize all of the processing unit's capacity.

Another approach has been to assign the administration and control, and often the execution, of all communications operations in a processing system to a single processing unit. This approach, however, has similar problems in that the communications needs of all or some of the user of the processing system may exceed the capacity of the single processing unit while, at other times, the processing unit may relatively idle but unavailable for other processing tasks. This approach has also been used to handle the administrative and control tasks for the communications network, that is, assigning the task of total network administration and control to a single processing system in the network, but has the same disadvantages as are found with this approach within a single system.

Yet another approach has been to distribute all communications administration, control and execution tasks among all of the systems in the network and, in its most extreme form, among all of the processing units of all of the systems. This approach has the problem that a complete copy all of the communications administration and control programs and the related administrative data structures of the entire network must reside in and be executed by each system, and often each processor in each system. This in turn imposes a very substantial overhead burden on the system processors, both to store and execute the programs and data structures.

The present invention provides a solution to these and other problems of the prior art and, in particular, to the problem of distributing the burden of execution of the actual communications over multiple local and remote service access points or the system processor units connected in a communications network.

SUMMARY OF THE INVENTION

A communications control system for distributing execution of communication connections among central processing units in a computer system interconnected in a data processing system by a communications network. Each computer system includes a processing system having a number of central processing units and a shared memory for storing programs for controlling operations of the central processing units and data to be operated upon by the central processing units. At least one user of the communications network is executing on a central processing unit and generating requests for communications operations with other users executing on central processing units of remote computer systems and the computer system includes at least one communication controller connected to the communications network.

The communications control system includes a connection distribution data structure, including, for each central processing unit, a connection count means for storing a number representing the number of communication connections currently being executed by the corresponding central processing unit, and a gate driver interface service module. The gate driver interface service module is a single task resident in the computer system memory with an active invocation in a single central processing unit of the processing system. The gate driver interface service module responds to each request by selecting and reading from the connection distribution data structure an identification of the central processing unit presently executing the least number of communication connections, and assigning the communication connection to the central processing unit presently executing the least number of communication connections for execution by constructing a corresponding control block, wherein each control block contains the identification of the central processing unit assigned to execute the communication operation. The gate driver interface service module provides the control block to a communication controller, and the communication controller being responds to a control block for performing the requested communication operation.

DESCRIPTION OF THE DRAWINGS

The foregoing and other objects, features and advantages of the present invention will be apparent from the following description of the invention and embodiments thereof, as illustrated in the accompanying figures, wherein:

FIGS. 2 and 2A are a block diagram of a multi-processor system incorporating the local area communications control system of the present invention while FIG. 2A is a representation of a local area control block;

FIG. 7 is a diagrammatic representation of local service access point data structures used in the distribution of local area communications connections over local and remote service access points of local and remote systems;

FIG. 8 is a diagrammatic representation of remote service access point data structures used in the distribution of local area communications connections over local and remote service access points of local and remote systems; and, FIG. 9 is a flow diagram representing the distribution of local area communications connections over local and remote service access points of local and remote systems.

DESCRIPTION OF A PREFERRED EMBODIMENT

A. General Description Of A System Incorporating The Local Area Network Control System (FIG. 1)

The following will refer to figures progressively as the elements of those figures are introduced into the following discussions but it should be realized that, in any discussion, elements may be referred to from preceding figures and that accordingly a reference to a figure should be taken as a reference which includes all preceding figures.

Figure 1:
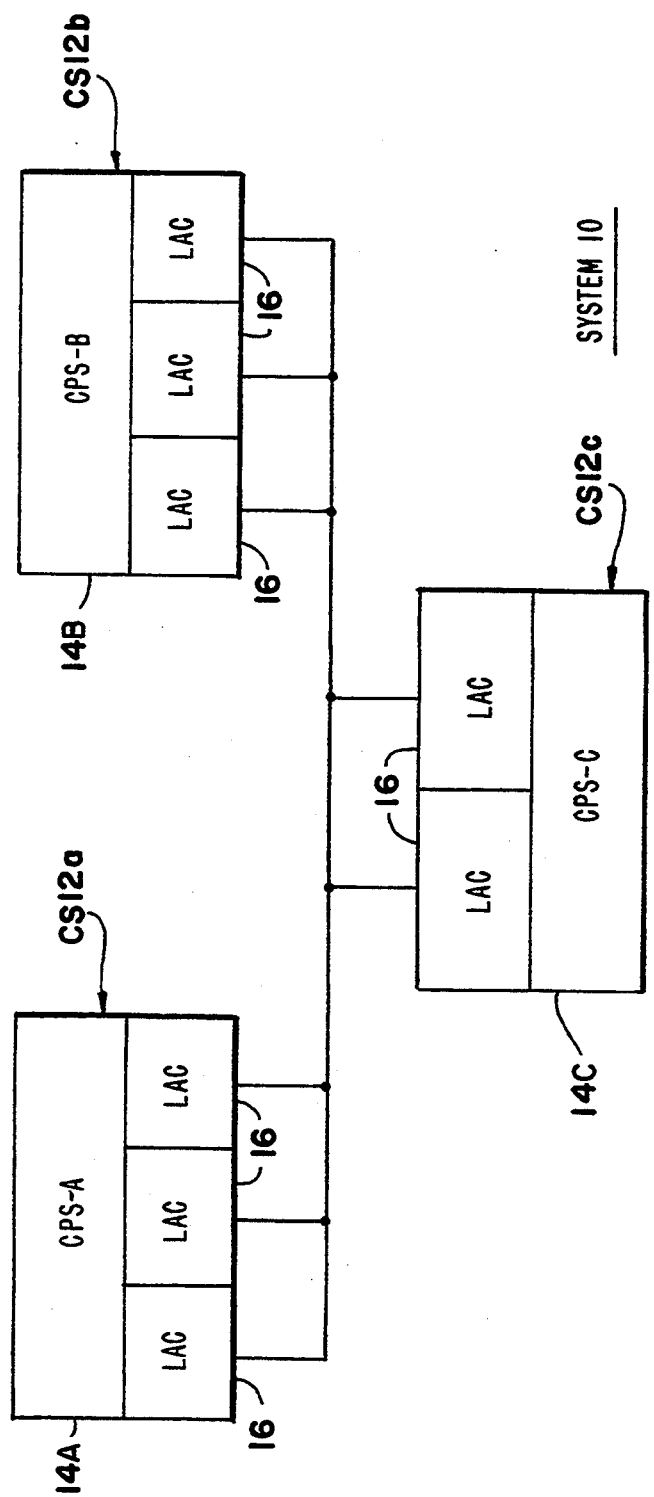
FIG. 1 is a block diagram of a system incorporating a local area communications network and the local area communications control system of the present invention.

Referring to FIG. 1, therein is shown a diagrammatic representation of a System 10 incorporating the Local Area Control Systems (LACS) of the present invention. As shown, System 10 includes a number of Computer Systems (CSs)12, illustrated as CS 12A, CS 12B and CS 12C, wherein each CS 12 includes a Central Processing System (CPS) 14, represented herein respectively as CPSs 14A, 14B and 14C, and one or more Local Area Controllers (LACs) 16, which are interconnected for local area network (LAN) communications between the CSs 12. As will be described below, each CPS 14 may be comprised of one or more central processing units, a memory and system buses.

B. Description Of The Local Area Control System (FIG. 2)

Figure 2A:
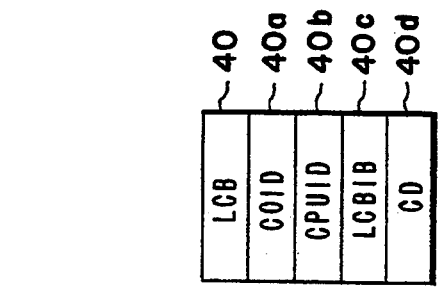
Figure 2:
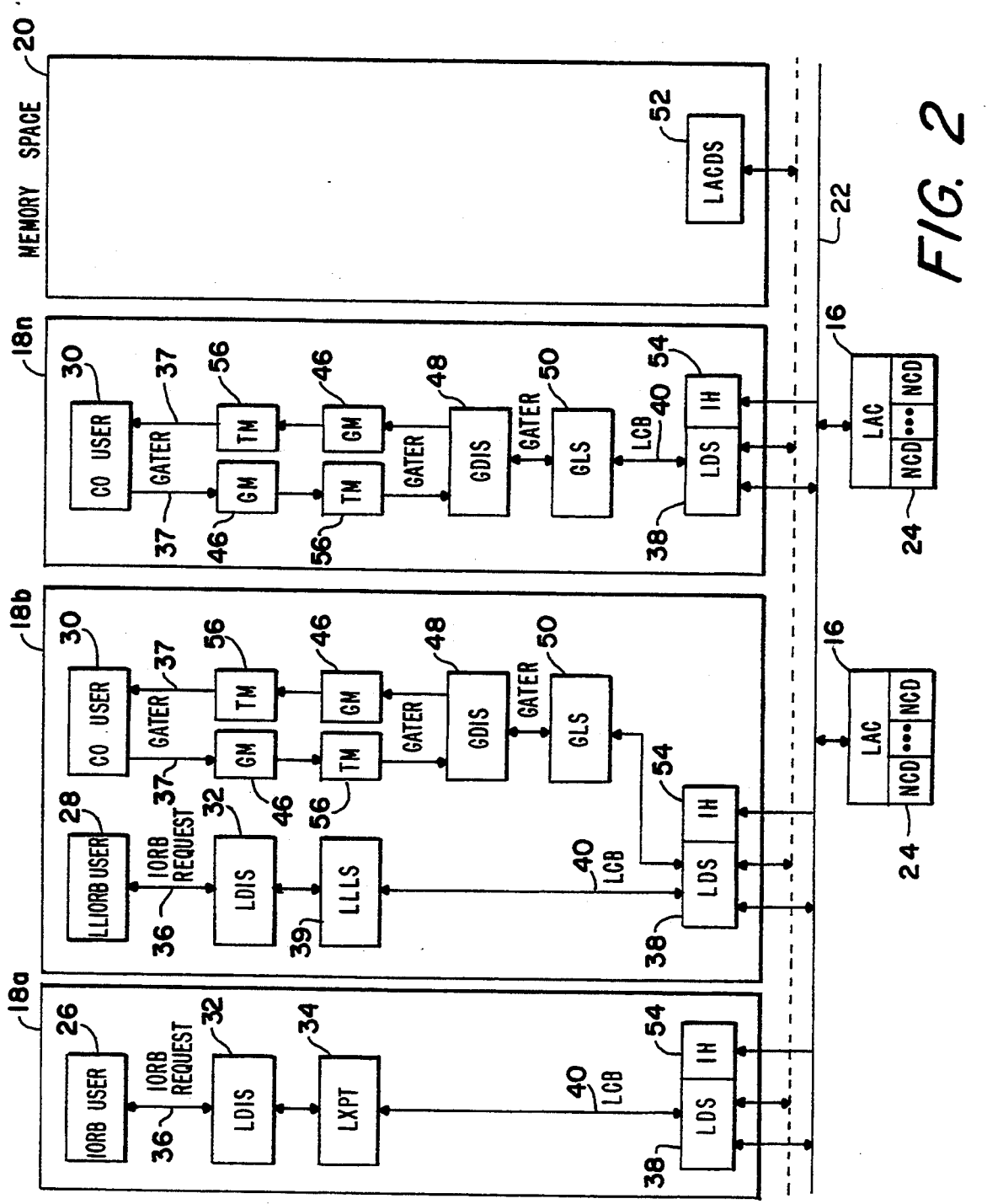

Referring to FIG. 2, therein is shown a diagrammatic representation of a Computer Processing System (CPS) 14 incorporating the LACS of the present invention. As illustrated, each CPS 14 may be comprised of multiple central processing units (CPUs), with the CPS 14 illustrated in FIG. 2 being represented generally as including CPUs 18a through 18n, with a memory, indicated as Memory Space 20 space, accessible to all CPUs 18 and a System Bus 22 interconnecting connecting CPUs 18, Memory Space 20 and a number of Local Area Controllers (LACs) 16, each of which may have control of one or more Network Communications Devices (NCDs) 24.

For purposes of clarity, the following will not show or discuss all of the details of the structure and operation of a computer system such as a CPS 14 or a LAC 16 as such are well known and understood by those of ordinary skill in the art. In addition, reference may be made to the previously referenced related patents and patent applications, which are incorporated herein by reference and which provide more detailed descriptions of CPSs 14 and LACs 16 similar to those illustrated herein. The following will instead concentrate on the specific aspects of the structure and operation of a Local Area Control System of the present invention which are of interest to one of ordinary skill in the art for an understanding of the present invention. Each CPU 18 and the Memory Space 20 associated with the CPUs 18 are thereby represented in terms of the LACS related programs and routines being executed or stored therein, and which will be discussed in detail herein below.

As has been described, the purpose of the present invention is to distribute the burden of local area communications between computer systems or between one or more computer systems and other systems among the central processing units of a computer system, rather than requiring a single central processing unit or a subset of the central processing units to handle all local area communications. Such communications are illustrated in part in FIG. 2 by three examples of communications facilities running on a system which may make use of local area communications. Two of these communications facilities are of a type referred to as "connection oriented" and "connectionless". They are represented as an Input/Output Request Block (IORB) User 26, such as a One Server facility available from Bull HN Information Systems Inc. of Billerica, Mass., a Link Layer (LL) IORB User 28. The users are usually permanently associated with a single CPU 18 which performs all communications related operations for the user. This relationship is indicated in FIG. 2, wherein IORB User 26 and IORB User 28 are each shown as associated with and executing on, respectively, CPU 18a and CPU 18b.

The third example is of a "connection oriented" service (CO) User 30, wherein delivery of data is guaranteed, by notice of error or disconnection if necessary, wherein the system accordingly maintains status and context for each data transfer operation, and wherein the user may request a transfer of data to or from a specific remote system or device. Examples of such could include Network Terminal Driver (NTD), the Oracle[1] system, and International Standards Organization (ISO) and Distributed Systems Architecture (DSA) sessions.

[1]Oracle is a trademark of Oracle Corporation.

CO User 30 type communications service are of particular interest to the present invention because of the requirement to maintain context for each communication operation. It should be noted that while CO Users 30 are illustrated as executing on CPU 18b and on CPU 18n, a CO User 30 may be executing on any or all of the CPUs 18 of a CPS 14 with no change in the operation of the present invention. The present invention in fact anticipates that there will be CO Users 30 executing on more than one CPU 18 of the CPS 14.

It will be noted from an examination of FIG. 2 that certain portions of the Local Area Control System of the present invention provides services to both connectionless LACS users such as IORB User 28 and connection oriented LACS users such as CO User 30, and that there are certain similarities between these users. For example, IORB User 26 communicates with a Layer Driver Interface Services (LDIS) 32 module by generating a Request 36 containing information pertaining to the request, while LDIS 32 in turn communicates with a Layer Transport (LXPT) 34 module, which is turn communicates with a Layer Driver Services (LDS) 38 module of the LACS of the present invention. LDIS 32 is effectively a router program which receives communications Requests 34 from IORB User 26, determines the appropriate communications layer to handle the Request 36 and sends the Request 36 to LXPT 34. LXPT 34 in turn constructs a Local Area Control Block (LCB) 40 from the Request 36.

As represented in FIG. 2A, each LCB 40 contains, among other things, a User Identification (COID) 40a containing information identifying the User 26 or 30 which originated the corresponding request, a CPU Identification (CPUID) 40b field containing an identification of the CPU 18 assigned to "handle" the LCB 40, that is, the Request 36, and a LCB Identification (LCBID) 40c field contains a unique connection identifier which is used to identify the LCB 40 and corresponding Request 36 by the connection manager facilities of the LACS. A LCB 40 will also contain one or more Communication Data (CD) 40d fields for storing information regarding the requested communication operation.

LDS 38 then routes the LCB 40 of the Request 36 to the appropriate LAC 16 to be executed. It should be noted that, as described, the CPU 18 which is to handle connectionless communications services is typically the CPU 18 upon which the connectionless user is running.

Responses to connectionless communication requests originated from a remote system or device follow the same path, but in reverse. That is, the response or incoming Request 36 is received in a LAC 16 and sent up, in the form of an LCB 40, to the IH 54 (Interrupt Handler 54) running on the CPU 18 associated with the connectionless user, which in turn sends the response or incoming Request 36 up to the IORB User 28 through LLLS 39 (Link Layer Services 39) and LDIS 32.

LL IORB User 26 is provided with a similar structure and operates in a similar manner, except that the functions of LLLS 39 are performed by a Layer Transport Link LXPT 34 module.

It should be noted that the above discussions have referred to "levels" and "layers" and, in this regard, it should be noted that a CPS 14 of the present invention, as is found in most computer systems, assigns priority levels to the various types of operations performed by the system. These "levels" generally define the priority of execution of various tasks, that is, a task of a higher priority level will be executed before a task of a lower priority level, and often involve the security facilities of the system, wherein a process executing on one "level" may or may not access a process or data executing or resident on another "level", depending on the respective levels and the reasons for access to another level. The various communications facilities of a system are often assigned to levels, or layers, in a similar manner and for similar purposes.

Next considering connection oriented users such as CO Users 30, the following will first discuss the operation of the LACS of the present invention at an overview level, and then will discuss the operation of the LACS of the present invention with particular respect to the features which allow the handling of connection oriented communications to be distributed among the CPUs 18 of the system.

At this point the difference between "connections" and "communications operations" should be noted for purposes of clarity in the following discussions. A "connection" is a communication path established between two or more CO Users 30 through a LACS NCD 24. A "communication operation", or data transfer, is a specific instance of an exchange of data between the CO Users 30 and has associated with it an LCB 40 which, as described, is used to identify and define the data transfer and a CPU 18 which has been assigned to handle the communication operation. A given connection may be used in one or more communications operations and therefore may have associated with it, at any time, one or more corresponding LCB 40s, one for each communication operation being executed through the connection.

First considering "outgoing" communication gate Requests 37, as indicated in FIG. 2, a Gater Request 37 for a communication operation with a connection oriented remote system or device, by a CO User 30, is handled by a Gate Driver Interface Services (GDIS) 48 awoken as a result of the Request 37. GDIS 48 sends the Gater Request 37 to the Gate Layer Services (GLS) 50, which, as described more fully below, uses LACS Data Structures (LACDS) 52 to determine which of the CPUs 18 is to handle the connection through which the communication operation is to be executed, enters the CPU 18 identification and a unique connection identifier into the LCB 40, and passes the LCB 40 to the LDS 38 on the CPU 18 in which the GLS 50 is executing. The LDS 38 then passes the LCB 40 to that LAC 16.

In addition to a number of routines for performing LDS operations, an LDS 38 includes an Interrupt Handler (IH) 54 which is responsive to interrupts generated by a LAC 16 as a result of an incoming communication received by a LAC 16, for example, as a result of a Gater Request 37 generated by a CO User 30. IH 54 in turn will use the information in the LCB 40 provided to determine which CPU 18 has been assigned to handle the particular corresponding communication, and will awake the LDS 38 in that CPU 18 to handle the incoming reply. The LDS 38 will then pass the incoming reply back up through the GLS 50 and GDIS 48 executing in the CPU 18.

"Incoming" requests from remote systems of devices are handled in a somewhat similar manner to "outgoing" Gater Requests 37, except that, upon system initialization, GLS 50 will generate a Service Access Point (SAP) Event LCB 40, which is essentially a "request" to "listen" for incoming communications on a SAP, on behalf of each User 30 to every SAP used the by User 30. The SAP Event LCB 40 is sent to the LAC 16 to which the SAP is assigned.

Thereafter, and upon receiving an incoming communication request from a remote system or device, the LAC 16 receiving the request will generate a corresponding interrupt to the LDS 38's IH 54, which in turn passes the LCB 40 to the GLS 50. GLS 50 will access the LACS data structures (LACDS 52) 52 to determine which CPU 18 is to be assigned to handle all incoming requests for this new connection. Thereafter, the communications operations for this connection will use the assigned CPU 18 and the LAC 16. The GLS 50 will generate a new SAP Event LCB 40 to replace the SAP Event LCB 40 which is "responded to" by the incoming request.

In has been stated above that a primary purpose of the LACS of the present invention is to distribute the handling of connection oriented communications operations among the central processing units of the computer system. For this reason, certain of the elements associated with connection oriented communications, as described just above, effectively "float" among the CPUs 18 of CPS 14. In particular, GDIS 48 and GLS 50 is spawned as a single, Memory Space 20 resident task and is attached to a level at system initialization. Also, LDS 38 will be spawned on every active CPU 18 of CPS 14 to handle communications operations for connections.

Because GDIS 48 is to float among the CPUs 18 of CPS 14, communication between a Connection Oriented (CO) User 30 and GDIS 48 is through the System Task Manager (TM) 56. For example, if a Gater Request 37 for LAN Service is from a CO User 30, CO User 30 issues the Gater Request 36 to GM 46 (Gate Manager 46), which invokes GDIS 48 through TM 56 on a CPU 18 selected by TM 56, and the CPU 18 on which the invocation of GDIS 48 occurs may or may not be the same CPU 18 that CO User 30 and GM 46 are running on.

All CO User 30 outgoing Gater Requests 37 will be handled on the CPU 18 that GDIS 48 is currently running on and a current invocation of GDIS 48 will remain active on a given CPU 18 so long as there are CO User 30 Gater Requests 37 queued to be handled by the invocation of GDIS 48. When there are no more CO User 30 Gater Requests 37 to be processes, that invocation of GDIS 48 will be "put to sleep", that is, become inactive, to "wake up", or become active, on a potentially different CPU 18 at the next occurrence of a CO User 30 Gater Request 37 for LAN services.

In the event of an incoming request for LAN services from a remote system or device, the SAP Event LCB 40 will, as described above, return on the CPU 18 which originally issued the SAP Event LCB 40 and the IH 54 of the LDS 38 running on that CPU 18 will invoke a GLS 50 routine, described below, to determine to which CPU 18 the new connection should be assigned. GLS 50 will access the LACDS 52 data structures to determine the CPU 18 to handle the connection, All future operations with regard to that connection will thereafter be handled by the assigned CPU 18.

C. LACS Load Balancing (FIGS. 3 and 4)

Figure 3:
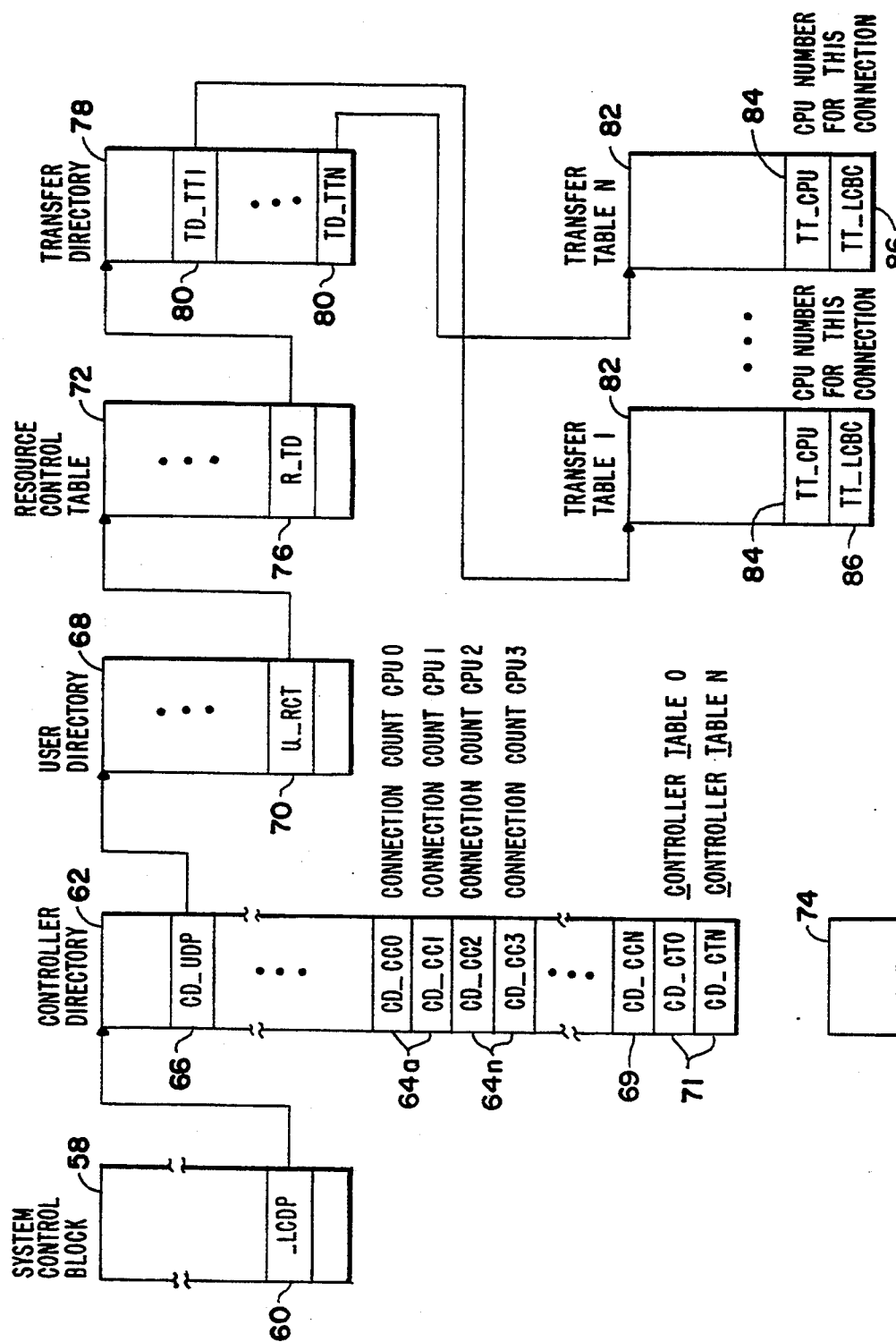
FIG. 3 is a diagrammatic representation of data structures used in distributing local area communication network connections over the processors of a multi-processor system.
Figure 4:
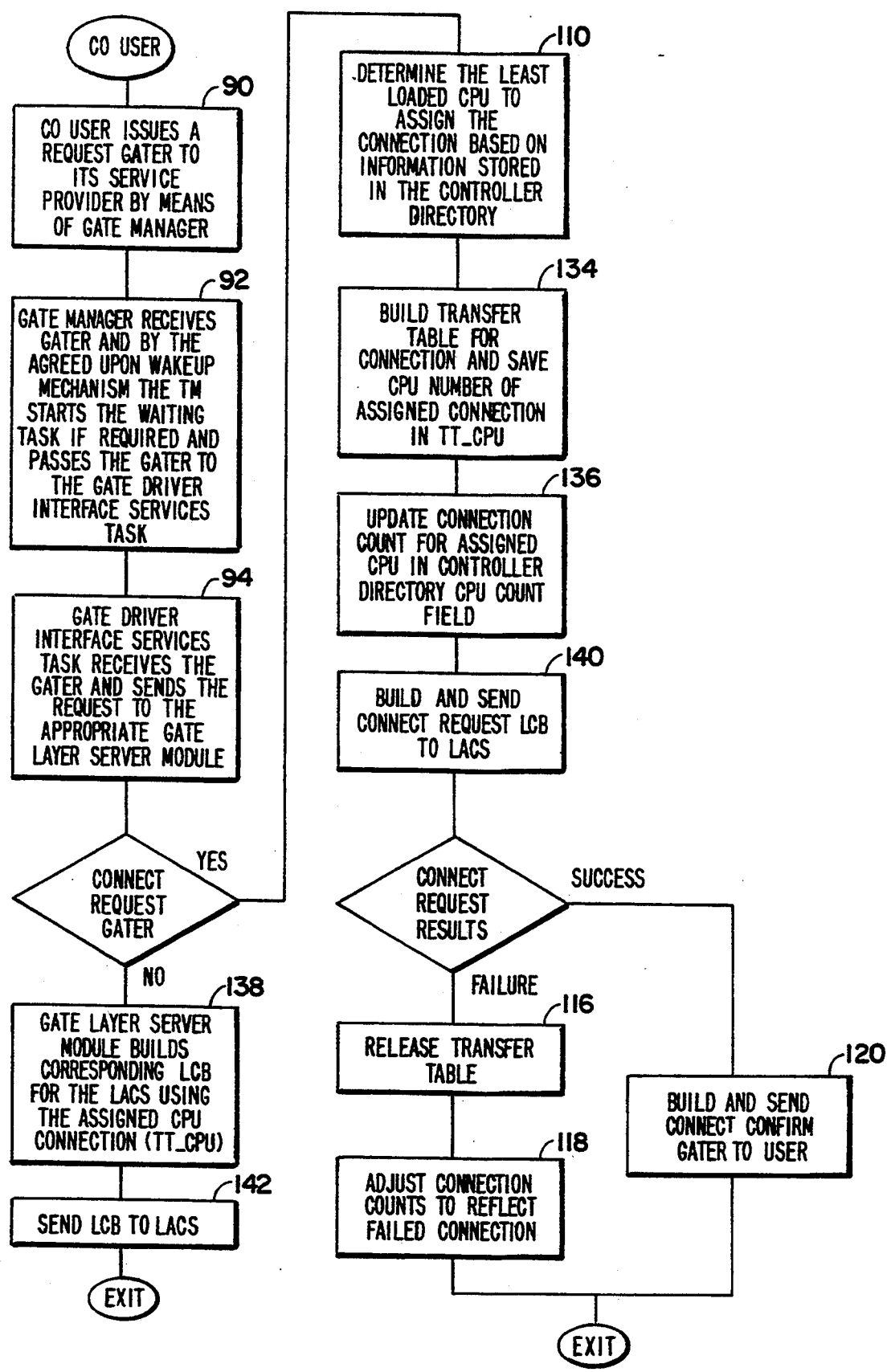
FIGS. 4 and 4A are a flow diagram illustrating the distribution of local area communication network connections over the processors of a multi-processor system.

The operation of the LACS of the present invention with regard to the distribution of the burden of local area communications between computer systems and the management of local area communications by the processors of a system is further illustrated in FIGS. 3 and 4, which represent data structures created and used by the LACS and CPS 14 in distributing the communications load over the CPUs 18 of CPS 14.

1. LACS Load Balancing Data Structures (FIG. 3)

FIG. 3 is diagrammatic representation of a set of data structures which are globally accessible to the LDSs 38 and IHs 54 running in the CPUs 18 of the CPS 14, and to the invocation of GM 46 running in one of the CPUs 18 of the CPS 14, and which are used in balancing the communications load among the CPUs 18 of the CPS 14. The data structures represented in FIG. 3 are used to store and manage information identifying the resources available for local area communications, the user of local area communications, the assignment of connections to the CPUs 18 of CPS 14, and the currently active connections.

As indicated in FIG. 3, the system comprised of CPUs 18 and Memory Space 20 maintains, in Memory Space 20, a System Control Block (SCB) 58 which contains a variety of information concerning the resources of CPS 14 and the status and state of operation of the various elements and resources of CPS 14. Included in this system information in System Control Block 58 is a field containing a LACS Controller Directory Pointer (LCDP) 60 which points to, that is, identifies the location in Memory Space 20, of a Controller Directory (CD) 62.

Controller Directory 62 contains a set of Controller Directory-Connection Count Fields (CD-CCs) 64, identified in FIG. 3 as CD-CC 64a through 64n. Each CD-CC 64 corresponds to one of CPUs 18a through 18n of the CPS 14 and stores the number of connections currently being served, or handled, by the corresponding CPU 18.

Controller Directory 62 further includes one or more fields for storing a Controller Directory-User Directory Pointer (CD-UDPs) 66 for each type of CO User 30, such as an NTD User, using local area communications in CPS 14. CD-UDP 66 in turn points to the location in Memory Space 20 of a corresponding User Directory (UD) 68, which in turn leads to further information regarding that particular CO User 30 type, including information regarding the connections currently being used by that CO User 30 type and a set of Controller-Directory Controller Tables pointers 69 pointing to a corresponding set of Controller Tables, described further below.

Each User Directory 68, as just described, corresponds to a given type of CO User 30 and contains a number of fields for storing User-Resource Control Table Pointers (U-RCTs) 70. Each U-RCT 70 in turn points to the location in Memory Space 20 of a Resource Control Table (RCT) 72 corresponding to that particular LAC 16. In this regard, CPS 14 maintains, in Memory Space 20, a set of system data structures which include a Network Service Access Point Directory (NSAPD) 74, which contains, for example, information identifying the characteristics and possible connections of Network Communications Devices (NCDs) 24 and the LACS 16 controlling the NCDs 24.

Each Resource Control Table 72 in turn contains a field for each NCD 24 controlled by the corresponding LAC 16 and each field of the Resource Control Table 72 in turn contains a Resource-Transfer Directory (R-TD) Pointer 76 which points to the location in Memory Space 20 of Transfer Directory (TD) 78.

Each Transfer Directory 78 is essentially an index into information pertaining to each connection and communication operation. As represented in FIG. 3, each Transfer Directory 78 contains a field for each connection currently being handled by the corresponding NCD 24. Each field of a Transfer Directory 76 contains a Transfer Directory-Transfer Table (TD-TT) Pointer 80 indicating the location in Memory Space 20 of a corresponding Transfer Table (TT) 82, where each TT 82 corresponds to a connection through the corresponding NCD 24.

To reiterate and summarize previous discussions, a connection is a communications path between two CO Users 30 through an associated NCD 24 and each NCD 24 may be involved in more than one connection. The relationships between NCD 24s and connections are related through Resource Control Tables 72 and Transfer Table 82. As has been described, each Resource Control Table 72 corresponds to a LACS 16 and contains fields identifying each NCD 24 controlled by that LACS 16. Each network communications device identified in a Resource Control Table 72 will in turn have an associated Transfer Table 82, which in turn contains a field for each connection established through that network communications device.

Each connection through a given NCD 24 may in turn be used in one or more communications operations, so that each connection may have associated with it, at any time, one or more corresponding LCB 40s, one for each communication operation being executed through the connection. Each LCB 40 will in turn have an associated CPU 18 assigned to handle the corresponding communication operation.

As described, each Transfer Table 82 corresponds to an active connection, that is, a connection between a CO User 30 of the CPS 14 and a CO User 30 of another CPS 14 through the NCD 24, and contains information regarding each communications operation being executed through the connection. As has been described, each communication operation is identified by a corresponding LCB 40, which contains information describing the communication operation, and has associated with it a CPU 18 which has been assigned to handle the communication operation.

The information stored in a Transfer Table 82 includes a Transfer Table-CPU (TT-CPU) 84 field for each communication operation being executed through that connection, wherein the TT-CPU 84 fields are indexed by the LCB 40 identifiers for the corresponding operations and each TT-CPU 84 field contains the identity of the CPU 18 assigned to handle the operation.

Each Transfer Table 82 further includes a Transfer Table-LCB Count (TT-LCBC) 86 field containing the number of LCB 40s, that is, the number of communications operations, currently being handled through the corresponding connection.

Controller Directory 62 and Transfer Tables 82 thereby contain all of the information necessary to manage the distribution of communication operations loads between the CPUs 18 of CPS 14. As described, each CD-CC 64 of Controller Directory 62 corresponds to one of CPUs 18a through 18n of the CPS 14 and stores the number of connections currently being served by the corresponding CPU 18. Transfer Table 82 in turn contain information regarding the number of LCB 40s, that is, communications operations, being served through each connection and the identification of each CPU 18 serving each communication operation through the connection.

2. Load Balancing Among CPUs 18 (FIG. 4)

Figure 4A:
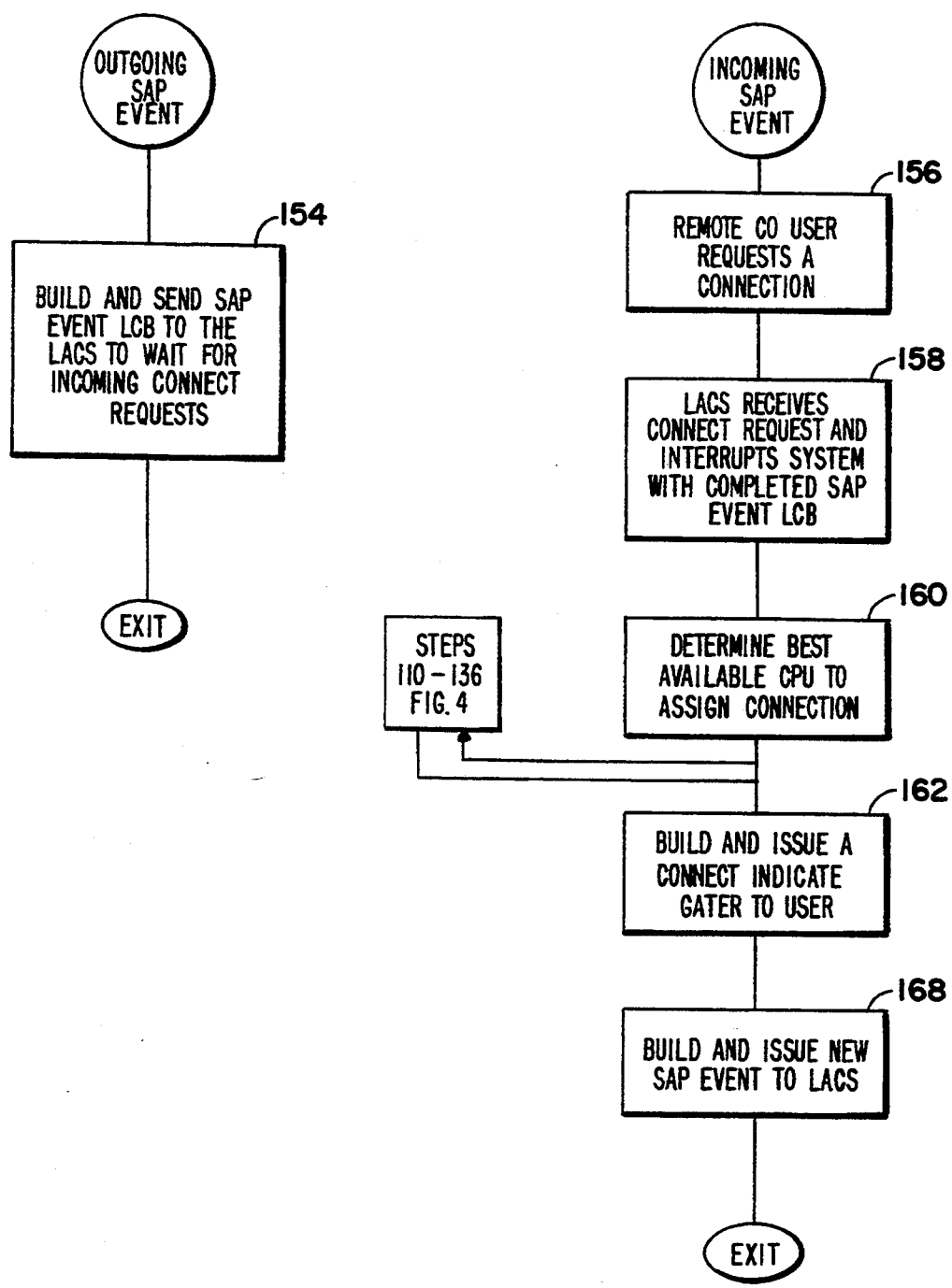

The operation of the LACS of the present invention in balancing the local area network communications load of CPS 14 among the CPUs 18 is illustrated in the flow chart shown in FIGS. 4 and 4A. The following discussion will follow the flow chart of FIGS. 4 and 4A, with the reference numerals appearing in brackets in the discussion indicating the corresponding steps or operations illustrated in FIGS. 4 and 4A.

As indicated therein, assuming that a communications gater Request 37 is initiated by a CO User 30 in step 90–94 the CO User 30 issues a Gater Request 37 to the GDIS 48 through the current invocation of GM 46, which interacts with Task Manager 56 to identify the CPU 18 on which the current invocation of GM 46 is executing.

. As described, the current invocation of GDIS 48 may not be executing on the same CPU 18 as the requesting CO User 30 and all "outgoing" Gater Requests 37 initiated by a CO User 30 will be handled by the CPU 18 on which GDIS 48 is currently executing. So long as there are CO User 30 Gater Requests 37 queued in GM 46, the current invocation of GDIS 48 will remain active on the CPU 18 on which it is currently executing. When there are no more active requests, GDIS 48 will "be put to sleep" and will be invoked again when another outgoing or incoming request becomes active, and may at that time be invoked on a different CPU 18.

GDIS 48 will (94) accept the Gater Requests 37. If the request is for an outgoing connection, GLS 50 of the current invocation of GDIS 48 will assign the connection to a CPU 18 as described below, using the LACS data structures discussed above with respect to FIG. 3.

GLS 50 will (110) read CD-CCs 64 to determine the CPU 18 currently supporting the least number of connections and use to handle the requested communication operation.

If GLS 50 found a CPU 18 handling the requested connection, but the attempt to establish a connection failed for any reason, the GLS 50 will (116) release the TT 82 and access (118) the appropriate CD-CC 64 field to correct the information therein.

If the connect request was successful, a connect confirm Gater (120) will be issued to the user and it would contain the connection identifier to be used by the CO User 30 for future requests of the connection.

If GLS 50 finds an available CPU 18 from the operations executed in step (110), GLS 50 will (134) save the assigned CPU 18 into the TT-CPU 84 and (136) update the CD-CC 64 fields accordingly.

At the conclusion of the paths defined by steps (110)–(134)–(136), GLS 50 will have determined and assigned a CPU 18 to manage the request. GLS 50 will then (140) write information identifying the CPU 18 which is to handle the communication operation, that is, the IH 52 which is to respond to the completed request from the CO User 30 communicated with, into a field of the corresponding LCB 40, this information being taken from the appropriate TT-CPU 84 field of the Transfer Table 82. The LCB 40 will then (142) be communicated to the LAC 16 controlling the assigned NCD 24.

In the event of an inbound request the response of the LACS to the inbound request will depend, in part, upon whether the request is a response from another CO User 30 in reply to a communication operation initiated by a local CO User 30 or a request initiated by another CO User 30.

"Incoming" requests from remote system devices are handled in a somewhat similar manner to "outgoing" Gater Request 37, except that, as described, upon system initialization a CO User 30 will have (154) generated a Service Access Point (SAP) Event Request, which is essentially a "request" to "listen" for an incoming communication request on a LAC 16. An LCB 40 is generated for the SAP Event Request as described above and the LCB 40 is passed down to all LACs 16.

Upon receiving an incoming request (156), the LAC 16 receiving the request will (158) generate a corresponding interrupt to the LDS 38's IH 54 in the CPU 18. GLS 50 will (160) access the IACS data structures using steps (110) through (136) (shown in FIG. 4) as described above to determine which CPU 18 is to be assigned to handle the incoming request, and will (162) generate a Gater Request 37 containing that information and pass it up to the CO User 30. Thereafter, the CO User 30 and the LAC 16 which received the incoming request will execute steps 138 to 168 and use the assigned CPU 18 and the LAC 16 to perform the requested communication operations, and the GLS 50 will (168) generate a new SAP Event LCB to replace the SAP Event LCB which was "responded to" by the incoming request.

The above description of the LACS of the present invention has described how each CPU 18 in the CPS 14 is provided with permanently resident request routing and management elements, LDS 38 and IH 54, to respond, respectively, to Requests 37 generated by CO Users 30 executing on the CPU 18 and access, through the permanently resident request management functions, to a single, floating invocation of GDIS 48 for managing communications operations and assigning the burden of communications operations among the CPUs 18 of a CPS 14. The above discussions have also described the global data structures used by the permanently resident request management functions and the floating communication operations manager in handling the communications operations, and have described in detail the flow of operations in managing and distributing communications operations among the CPUs 18.

The following discussions will describe further aspects of the distribution of the communications operation management functions among the CPUs 18 and will describe the means by which the LACS of the present invention optimizes the use of available communications paths between the elements of a local area network.

D. LACS LCB Queuing (FIG. 5)

It is apparent from the above descriptions that a CPS 14 will very probably, at any given time, be processing a number of communications operations in the manner described above. It will also be apparent, as is well known to those of skill in the art, that there is a limit on the number of communications operations that may be processed at one time by any system and that it is therefore necessary to provide some means for holding, or queuing, communications operations in excess of the number that may be handled by the system at any given time. In a system of the prior art, for example, using one CPU 18 to manage all communications operations, only one operation may be handled at a time.

Figure 5:
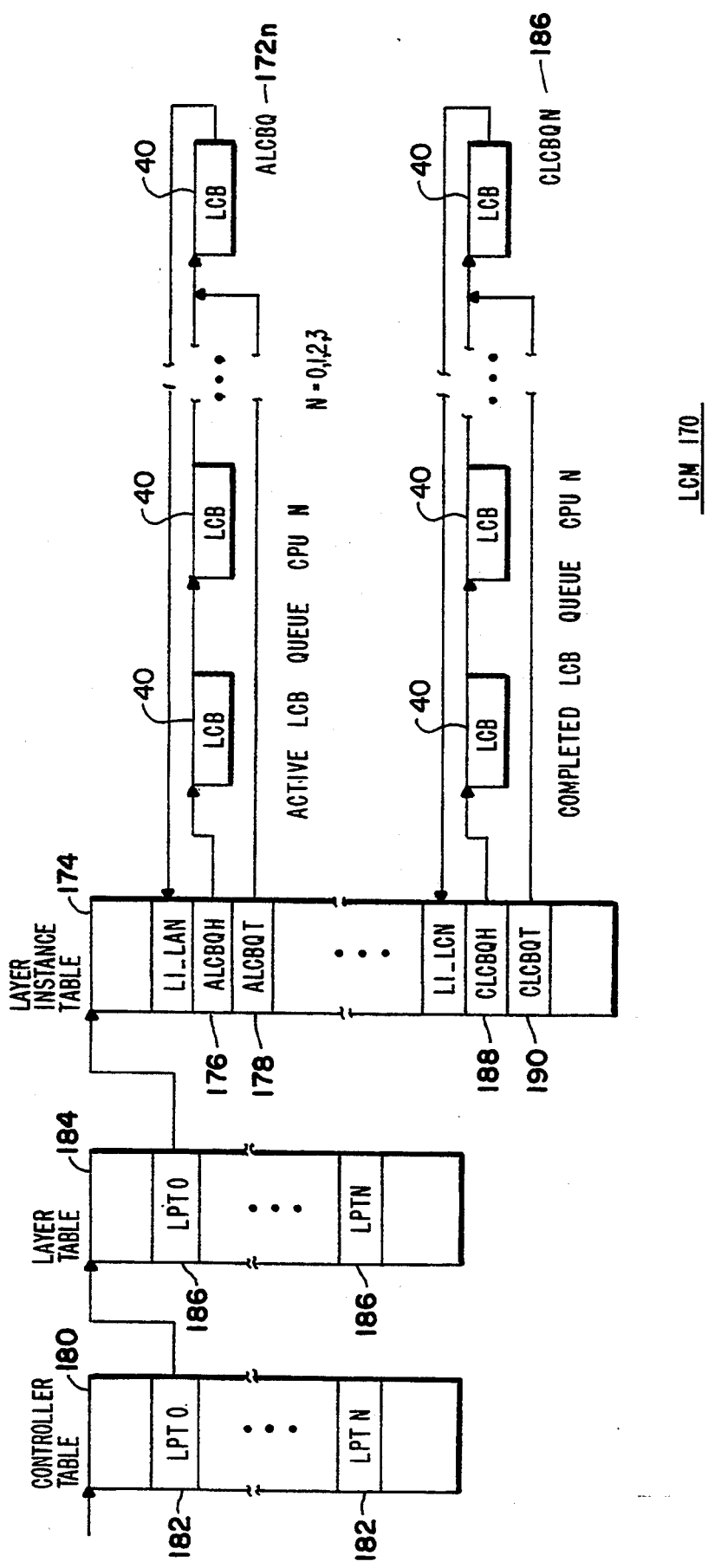
FIG. 5 is a diagrammatic representation of a multiple queue system for managing the queuing of communications operations over the processors of a multi-processor system.

FIG. 5 illustrates a communications operations queue mechanism of the LACS of the present invention which distributes the handling, or queuing of operations, over the CPUs 18 of the CPS 14 and which provides a more efficient mechanism for managing queues.

As shown therein, LACS Queue Mechanism (LQM) 170 includes an Active LCB Queue (ALCBQn) 172 for each CPU 18 and each ALCBQn 172 is used to store the LCB 40s which are currently "active" and assigned to the corresponding CPU 18. All LCBs 40 which are currently assigned to a CPU 18 are written into the CPU 18's ALCBQ 172 when the LCB 40 is sent to an LAC 16 by a CPU 18 by the current invocation of GLS 50 and by the LDS 38 executing on the CPU 18.

As has been described, an LCB 40 may result from a Gater Request 37 generated from a CO User 30 executing on a CPU 18 or be a SAP Event LCB 40 "returned" from a LAC 16 as a result of an incoming request from a remote CO User 30. As also described, an LCB 40 may "return" on a CPU 18 which is different from the CPU 18 which generated the original request, so that there is no direct relationship between a given LCB 40 and the CPU 18 which was originally assigned to handle the communication operation represented by the LCB 40.

The relationship between LCB 40s and the CPU 18s assigned to "handle" the LCB 40s is thereby maintained through a Layer Instance Table (LIT) 174 which includes, for each CPU 18n, an Active LCB Queue Head (ALCBQHn) 176 field for storing an address pointer indicating the location in Memory Space 20 of the "head" of the ALCBQn 172 corresponding to the CPU 18 and an Active LCB Queue Tail (ALCBQTn) 178 field for storing an address pointer indicating the location in Memory Space 20 of the "tail" of the ALCBQn 172 corresponding to the CPU 18. In addition, the LACS maintains, in association with LIT 174, a Controller Table (CT) 180 containing a Layer Table Pointer (LTP) 182 field for storing an address pointer indicating the location in Memory Space 20 of the start of the LT 184 and, for each Later Instance Table Pointer (LTP) 186, stores an address pointer indicating the location in Memory Space 20 of the LIT 174.

As each LCB 40 or SAP Event LCB 40 "completes" on its corresponding LAC 16, the IH 52 will "wake up" on the CPU 18 identified in the CPUID 40b field of the LCB 40 as assigned to handle that LCB 40 and invoke GLS 50 to process the completed LCB 40. Each CPU 18 therefore processes only those LCB 40s which have been assigned to the CPU 18, so that the processing of completed LCB 40s is, like the creating and handling of LCB 40s, and handling of local area communications operations in general, is distributed over the CPU 18s of the CPS 14 and the bottlenecks and delays in processing completed LCB 40s is accordingly reduced significantly.

The LACS of the present invention further includes a dual queue mechanism for facilitating the processing of LCB 40's by each CPU 18. As has been described, queue mechanisms usually process queue entries by marking completed entries, scanning the queue from start to finish for completed entries and, upon finding a completed entry, extracting and processing the first completed entry located. The queue mechanisms then return to the head of the queue and scan the queue to find the next completed entry, and so on until a pass through the gueue finds to further completed entries. This approach requires many passes through the queue simply to find all the completed entries, and is often a bottleneck in the processing of entries, such as LCB 40s.

As shown in FIG. 5, in addition to an Active LCB Queue (ALCBQn) 172 for each CPU 18, LCM 170 also includes a Completed LCB Queue (CLCBQn) 186 for each CPU 18, that is, there is a CLCBQn 186 corresponding to each ALCBQn 172, and each CLCBQn 186 is used to store the completed LCB 40s which are assigned to the corresponding CPU 18. Each time that one or more LCB 40s assigned to a given CPU 18 are completed, the IH 52 scans the corresponding ALCBQn 172 for the completed LCB 40s, from beginning to end, and dequeues all completed LCB 40s that are found and queues them into the corresponding CLCBQ 180. The CPU 18 associated with that ALCBQ 172 and CLCBQn 180 may then access and process the completed LCB 40s in the corresponding CLCBQn 180.

In addition to the CLCBQ 186s themselves, the LACS of the present invention maintains additional address pointer fields in LIT 174 which are used by the CPU 18s and IH 52s to locate the CLCBQ 186s and the entries therein. These additional pointers include, in LIT 174 and for each CLCBQn 186, a Completed LCB Queue Head (CLCBQHn) 188 field for storing an address pointer indicating the location in Memory Space 20 of the "head" of the CLCBQn 186 and a Completed LCB Queue Tail (CLCBQTn) 190 field for storing an address pointer indicating the location in Memory Space 20 of the "tail" of the CLCBQn 186.

As described above, the provision of a separate LCB queue mechanism for each CPU 18 distributes the burden of processing LCB 40 over the CPU 18s of the CPS 14 so that each CPU 18 processes only the LCB 40s assigned to it and so that no CPU 18 is blocked from accessing the LCB queue mechanism by another CPU 18 which is attempting to access the LCB queue mechanism. The provision of a dual queue mechanism for each CPU 18, that is, a queue for active LCB 40s and a separate queue for completed LCB 40s further enhances the speed of processing of both active and completed LCB 40s in that, first, all completed LCB 40s are found and dequeued from the active LCB 40 queue and queued to the completed LCB 40 queue in a single pass through the active LCB 40 queue, thereby significantly reducing the processing time to locate and access the completed LCB 40s. Secondly, the queuing of new active LCB 40s into the active LCB queue is largely separated from the processing of completed LCB 40s from the completed LCB queue, that is, both processes are not competing for access to a single queue, so that both processes may be executed more rapidly.

E. Local/Remote Balancing of Connections Over Service Access Points (FIGS. 6, 7, 8 and 9)

The LACS mechanisms and structures described above have been primarily concerned with the distribution and balancing of the burden of local area communications over the processors of a single processing system such as CPS 14. The LACS of the present invention includes further mechanisms, described next below, for distributing and balancing the burden of communications over the potential communications paths, that is, the service access points, between processing systems.

1. General Description of Local/Remote Load Balancing (FIG. 6)

Figure 6:
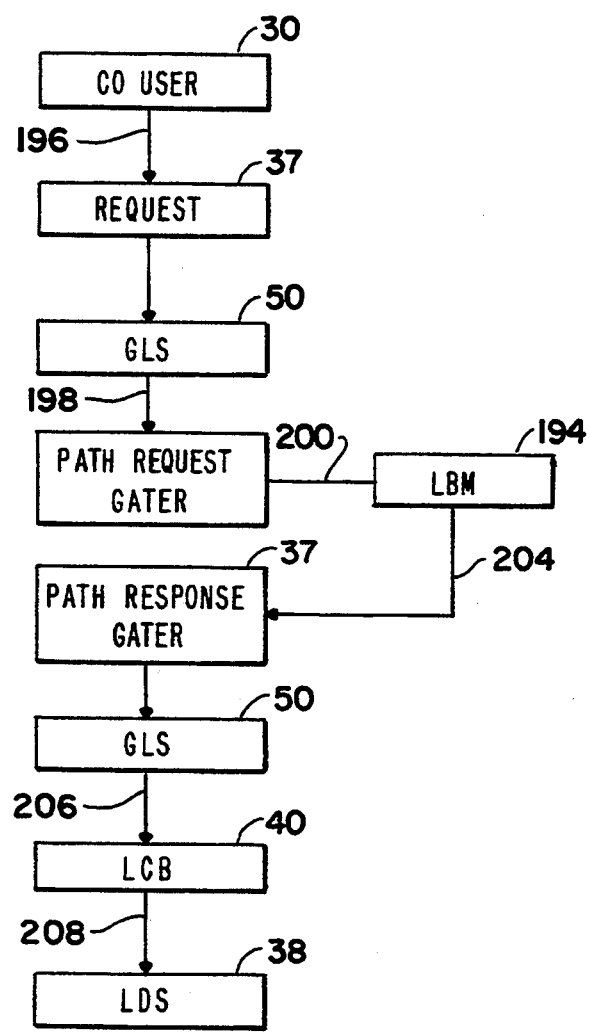
FIG. 6 is a general diagram for the distribution of local area communications connections over local and remote service access points of local and remote systems.

Referring to FIGS. 6, which is a generalized functional and flow diagram of the local/remote path load balancing functions of the LAN programs of the present invention, the LAN programs of the present invention includes a Remote Load Balancing Module 194 for distributing and balancing the burden of communications over the potential communications paths, that is, the service access points, between processing systems.

As indicated in FIG. 6, which is a generalized representation of the LAN programs illustrated in greater detail in FIG. 2, a CO User 30 (196) generates a connect Request 37 through GLS 50 which causes (198) path request Gater 37 to be built, which is subsequently (200) transmitted to Load Balancing Module (LBM) 194. LBM 194 then determine the preferred path for the communication connection between the local and remote users specified in the path request Gater 37, that is, the local and remote SAPs to form the path. LBM 194 (204) returns the path information to GLS 50 as a path response Gater 37 and GLS 50 (206) constructs a LCB 40, as described previously, containing the identifications of the local and remote SAPs selected to form the connection path. The resulting LCB 40 is (208) sent to LAN Driver Services (LDS) 38 and subsequently to the LACS 16 containing the selected local SAP to control the communication connection executed through the NCD 24 of the SAP.

As illustrated in FIGS. 7 and 8, Remote Load Balancing Module 194 maintains two data structures, indicated respectively in FIG. 7 as Local User List (LUL) 210 and in FIG. 8 as Remote User List (RUL) 212, for storing information used in balancing the use of communications paths between the local users and remote users. These data structures contain information describing the presently active connections between local users and remote users, with LUL 210 containing information particular to the local users and RUL 212 containing information particular to the remote users. It should be noted that RUL 212 is not a data structure which is global and accessible to all CPS 14s across a network of CPS 14s interconnected through the local area communications system, but contains only information regarding remote users from the viewpoint of the local CPS 14. That is, RUL 212 contains information regarding only the remote CO Users 30 and communications paths which are the subject of connections from the local CO Users 30.

2. Local User List (FIG. 7)

Referring to LUL 210 in FIG. 6, the LUL 210 maintained by Remote Balancing Module 194 contains a linked chain of one or more of User Tables (UTs) 214, with each UT 214 corresponding to one CO User 30 executing in the local CPU 18s of the CPS 14.

Each UT 214 includes a Next User Table (NUT) 216 field for storing an address pointer to the location in Memory Space 20 of the next UT 214 of the chain of UT 214s, and a User Name (UN) 218 field for storing an identification of the corresponding CO User 18. Each UT 214 also incudes a Local Information Table Pointer (LINFOTP) 220 field for storing an address pointer to the location in Memory Space 20 of the first of a linked chain of one or one or more Local Information Tables (LINFOTs) 222 associated with the UT 214, wherein each LINFOT 222 corresponds to an NCD 24 currently supporting connections between the UT 214's corresponding local CO User 30 and one or more remote Users 30. Each UT 214 also includes a Number of Local Information Tables (NLIT) 224 field for storing the number of currently active LINFOTs 222 presently associated with each UT 214.

Each NCD 24 is a potential Service Access Point (SAP), that is, a communications connection, or point, through which one system may access another point, and LINFOT 222 includes a SAP Name (SAPN) 226 for storing a name assigned to the SAP implemented through the corresponding NCD 24. Each LINFOT 222 also includes a Local Area Network Identification (LANID) 228 field for storing an identification of the Local Area Network through which the connection between systems is established, and a Controller Number (CN) 230 field for storing an identification of the LAC 16 controlling the NCD 24 corresponding to that LINFOT 214.

Each LINFOT 222 further includes a Maximum Connections (MAXCON) 234 field for storing a number representing the maximum number of connections this SAP may support at any given time, a Current Connections (CC) 236 field for storing a number representing the number of connections currently active on this SAP, and a System Connected (SC) 238 field for storing a number representing the number of different remote systems to which this SAP is currently connected.

Each LINFOT 222 includes a Next Local Information Table (NXTLINFOT) field for storing an address pointer to the location in Memory Space 20 of the next LINFOT 222 of the chain of LINFOTs 222. As described, there will be more than one LINFOT 222 in the chain of LINFOTs 222 if there is more than one providing a connection between the corresponding local CO User 30 and one or more other remote CO Users 30.

Each LINFOT 222 further contains a Remote Information Table Pointer (RITP) 242 field for storing an address pointer to the location in Memory Space 20 of the first of a chain of one or more Remote Information Tables (RITs) 244 associated with the LINFOT 222. Finally, each LINFOT 222 includes a Local SAP Table Pointer (LSAPTP) 246 field for storing an address pointer to the location in Memory Space 20 of a Local SAP Table (LSAPT) 248 containing information identifying a SAP in the local CPS 14.

There will be one or more RITs 244 in the chain of RITs 244 associated with each LINFOT 222, wherein each RIT corresponds to at least one active connection between the local CO User 30 associated with the UT 214 from which the RIT 244 and its parent LINFOT 222 are dependent, and each RIT 244 will contain information regarding the corresponding remote CO User 30. Each RIT 244 contains a Remote User Name (RUN) 250 field for storing a name identifying the corresponding remote CO User 30 with which the local CO User 30 has the active connection, and a Remote Address (REMADD) 252 field for storing the Local Area Network address of that corresponding remote CO User 30.

Each RIT 244 further includes a SAP Remote Connections (SAPRC) 254 field for storing a number representing the number of connections between the NCD 24 with which the RIT 244 is associated and the remote CPS 14. Finally, each RIT 244 contains a Next Remote Information Table Pointer (NXTRITP) 256 field for storing an address pointer to the location in Memory Space 20 of the next RIT 244 of the chain of RITs 244.

3. Remote User List (FIG. 8)

Referring now to FIG. 8, Remote User List (RUL) 212 is comprised of a linked chain of one or more Remote Address Tables (RATs) 258 headed by a Remote User List Header (RULH) 260. RULH 260 is comprised of a Remote Address Table Pointer (RATP) 262 field for storing an address pointer to the location in Memory Space 20 of the first RAT 258 of the linked chain of RATs 258 and a Number of Remote Address Table (NRAT) 264 field for storing a value representing the number of RATs 258 in RUL 212.

Each RAT 258 corresponds to a remote CO User 30 and includes a Name of System (NS) 266 field for storing a name identifying the system on which the remote CO User 30 resides, a Name of Remote User (NRU) 268 field for storing a name identifying the remote CO User 30, and a Remote Physical Address (RPA) 270 field for storing the physical address on the Local Area Network of the CO User 30.

Each RAT 258 further includes Current Number of Connections (CNC) 272 field for storing a number representing the number of active connections currently between the local CPS 14 and the remote CPS 14 in which the remote CO User 30 resides, and a Number of Failed Connections (NFC) 274 for storing a number representing the number of attempted connections to the remote CO User 30 which have failed to be established.

Each RAT 258 also includes a Remote SAP Pointer (RSAPP) 276 for storing an address pointer to the location in Memory Space 20 of a Remote System Access Table (RSAT) 278 used to store information about each SAP known to the local CPS 14 in the remote CPSs 14, each RSAT 278 corresponding to one remote SAP.

Finally, each RAT 258 includes a Next Remote Address Table Pointer (NRATP) 280 field for storing an address pointer to the next RAT 258 in the linked chain of RATs 258.

4. Load Balancing and Connection Counts

To summarize, both LUL 210 and RUL 212 contain information regarding all connections between the System Access Points of the local CPS 14 and the known System Access Points of the remote CPS 14s connected into a local area network with the local CPS 14. While there is a degree of overlap between the information contained in LUL 210 and RUL 212, it may be seen from the data structures of LUL 210 and RUL 212 that the focus of the information contained in LUL 210 is with regard to details concerning the local System Access Points while the focus of the information contained in RUL 212 is with regard to the System Access Points of the remote CPS 14s.

That is, the information in LUL 210 is structured, from the top down, as (per local CO User 30)/(per NCD 24)/(per remote CO User 30), with an associated Local SAP Table (LSAPT) 248 which contains information identifying a SAP in the local CPS 14. In contrast, the information in RUL 212 is structured, from the top down, as (per Remote CO User 30), with an associated Remote System Access Table (RSAT) 278 used to store information about each SAP known to the local CPS 14 in the remote CPSs 14 which are connected into a local area network with the local CPS 14.

It should also be noted that LUL 210 and RUL 212 both contain information regarding the number of currently active connections between each local SAP and each remote SAP and that, as described in detail below, this information is used in balancing the number of connections between the local System Access Points and each of the remote System Access Points.

In particular, LUL 210 maintains connection count information from the viewpoint of local System Access Points, each UT 214 has one or more associated LINFOT 222s, as described above, there will be a linked chain of one or more LINFOT 222s associated with each UT 214, wherein each LINFOT 222 associated with a given UT 214 corresponds to an NCD 24. Each LINFOT 222, in turn, contains a Maximum Connections (MAXCON) 234 field for storing a number representing the maximum number of connections this local SAP may support at any given time, a Current Connections (CC) 236 field for storing a number representing the number of active connections in this local SAP, and a System Connected (SC) 238 field for storing a number representing the number of different remote systems to which the corresponding NCD 24 is currently supporting connections.

RUL 212 in turn maintains connection count information with regard to the remote System Access Points, having a Remote Address Table (RAT) 258 for each remote CO User 30. Each RAT 258 in turn contains a Current Number of Connections (CNC) 272 field for storing a number representing the number of active connections currently between the local CPS 14 and the remote CPS 14 in which the remote CO User 30 resides, and a Number of Failed Connections (NFC) 274 for storing a number representing the number of attempted connections to the remote CO User 30 which have failed to be established.

Referring now to the connection counts maintained by LUL 210 and RUL 212, the connection count stored in LUL 210's Current Connections (CC) 236 field, hereafter referred to as the Local Current Connections Count, represents the number of connections currently active through that SAP, while the connection count stored in RUL 212's Current Number of Connections (CNC) 272 field, hereafter referred to as the Remote Current Connections Count, represents the number of currently active connections between the local CPS 14 and the remote CPS 14's SAP. Thus the LACS of the present invention tracks not only the number of connections from each of its local System Access Points but the number of connections it has to each remote SAP.

The function of the Load Balancing Module is to determine the best path that exists from the local system to the remote system. The best path is a local and remote SAP pair whose Effective Connection Count, described below, is the lowest.

The process starts when a path request is sent to the Load Balancing Module, wherein the request contains two parameters, a local SAP name, that is, a local user name, and the remote address with which the user wishes to connect.

The Load Balancing Module parses the Local User List 210 looking for the User Table 214 entry whose name matches the user passed in the path request. Once that is found, the list of Local Information Tables (LINFOT) 222 belonging to the User Table 214 is parsed. For every LINFOT 222 in the list, the Remote User List (RUL) 212 is parsed. For every Remote Address Table (RAT) 258 in the list, the remote physical address field is compared to the remote address passed in the path request. If they match, a check is made to see if the current LINFOT 222 and the current RAT 258 represent SAPs located on the same LAN. This is done by checking to see if the Layer Instance Pointer in the LINFOT 222 is the same as the Layer Instance Pointer in the RAT 258. If they are not equal, the next RAT 258 in the RUL 212 is checked, If they are equal, the Effective Connection Count (ECC) is calculated as:

ECC=LINFOT Current Number of
Connections+RAT Current Number of
Connection+(Weight×RAT Failed Number of
Connections.

If the new ECC is less than the previous best ECC, the current LINFOT 222 and RAT 258 are saved off and represent the current best path that exists between the local user and the remote address that were passed in the path Request Gater 37.

Once the list of LINFOTs 222 belonging to the User Table 210 has been parsed, a check is made to see if a best path was found. If no path was found, a path response with error status is built and returned. If a path was found, a path response Gater 37 is built with two response parameters, a local SAP table and a remote SAP table. The local SAP table is retrieved from the saved LINFOT 222 and the remote SAP table is retrieved from the saved RAT 258. These SAP tables signify the path with the lowest connection load.

When a connection is established, the Connection Count Field 236 of the appropriate LINFOT 222 is incremented along with the Connection Count Field 272 of he appropriate RAT 258. When a connection is terminated, the fields are decremented by one.

If a connection attempt fails, the Number of Failed Connections Field 274 of the Appropriate RAT 258 is incremented. The weighting of a remote SAP's Remote Connection Count allows the local LACS to adapt to the availability of a remote SAP by adjusting the frequency with which the local LACS will attempt to establish a connection to the remote SAP. Increasing a remote SAP's Remote Connection Count by a factor dependent upon the number of failed attempts to establish a connection through that remote SAP will thereby move that remote SAP's position in the order in which the connections are attempted towards the higher Remote Connection Count end of the order.

The frequency with which the local LACS will attempt to establish a connection through a remote SAP having a high Remote Connection Count, either because of failed attempts to establish connections or because of a relatively high number of assigned connections, will thereby be reduced. Correspondingly, the frequency with which a given remote SAP is attempted for connections will increase as its Remote Connection Count decreases relative to the Remote Connection Counts of other SAPs providing access to the same remote CO Users 30.

5. Operation of Local/Remote Load Balancing (FIG. 9)

Figure 9:
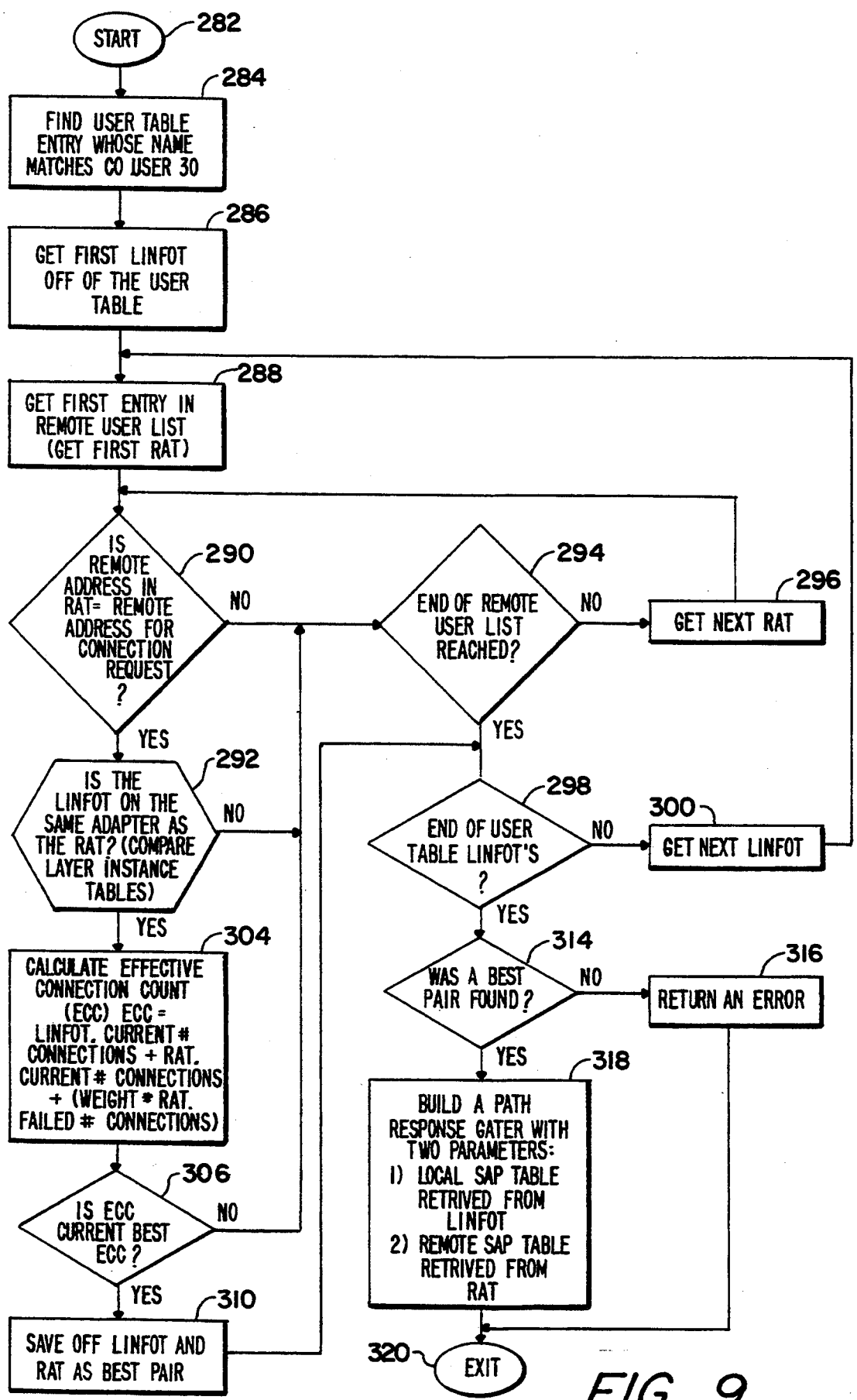

Referring to FIG. 9, therein is illustrated the operation of Load Balancing Module 194 as a process comprising steps 282 through 320. The flow of operations illustrated in FIG. 9 will not be discussed in further detail herein as the operation of Load Balancing Module 194 has been described in detail above and as the functions performed in each step illustrated in FIG. 9 are described in detail in the explanatory text appearing therein.

While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. In a data processing system including a plurality of computer systems interconnected by a communications network, each computer system including
- a processing system having a plurality of central processing units and a shared memory for storing programs for controlling operations of the central processing units and data to be operated upon by the central processing units,
- at least one user of the communications network, each user executing on a central processing unit of the computer system and generating requests for communications operations with other users executing on central processing units of other of the computer systems, and
- at least one communication controller, each communication controller being connected to the communications network for forming communication connections between users, a communications control system for distributing execution of communication connections among the central processing units, comprising:

a connection distribution data structure, including
  for each central processing unit,
    a connection count means for storing a number representing the number of communication connections currently being executed by the corresponding central processing unit, and
a gate driver interface service means,
  the gate driver interface service means being a single task resident in the computer system memory and having an active invocation in a single central processing unit of the processing system,
  the gate driver interface service means being responsive to each request for selecting and reading from the connection distribution data structure
    an identification of the central processing unit presently executing the least number of communication connections, and
    assigning the communication connection to the central processing unit presently executing the least number of communication connections for execution by constructing a corresponding control block,
      each control block containing the identification of the central processing unit assigned to execute the communication operation, and
    providing the control block to a communication controller,
  each communication controller being responsive to a control block for performing the requested communication operation and including in each communication controller
  means responsive to a communication from a communication controller in another computer system in response to a communication from a user and corresponding to a control block resident in the communication controller for
    generating an corresponding interrupt output,
      the interrupt output identifying the central processing unit assigned to execute the corresponding communication operation, and
    transmitting the corresponding control block to the central processing unit assigned to execute the corresponding communication operation, and in each central processing unit having a user executing therein,
  an interrupt handler responsive to a communication controller interrupt output and corresponding control block identifying the central processing unit as assigned to execute the corresponding communication operation for transferring the control block to an invocation of the gate layer service means on the assigned central processing unit,
  the gate layer service means being responsive to the control block for transmitting the communication to the local user.

2. The communications control system of claim 1, wherein:
  the gate driver interface service means is responsive to a request from the user for invoking the gate layer service means in the central processing unit of the gate driver interface service means.

3. The communications control system of claim 1, wherein:
  each user is responsive to being initialized on the computer system for generating a request to receive receive requests from other computer systems directed to the user,
  the gate driver interface service means is responsive to the receive request for communicating the receive request to the presently active invocation of the gate layer service means,
  the gate layer service means is responsive to the receive request for constructing a corresponding receive control block, and
  providing the receive control block to the communication controller, and
wherein each communication controller further comprises,
  means responsive to a communication request from a communication controller in another computer system for a communication operation with a user in the computer system for
    generating a corresponding incoming request interrupt output, and
    transmitting the corresponding control block to the central processing unit in which the presently active invocation of the gate layer service means is resident, and
wherein each central processing unit further includes,
  an interrupt handler, wherein the interrupt handler in the central processing unit in which the presently active invocation of the gate layer service means is responsive to a communication controller incoming communication interrupt and the corresponding receive control block for transferring the control block to the gate layer service means, the gate layer service means is responsive to the gate request for selecting and reading from the connection distribution data structure an identification of the central processing unit presently executing the least number of communication connections, and assigning the communication connection to the central processing unit presently executing the least number of communication connections for execution by writing into the control block the identification of the central processing unit assigned to execute the communication operation, and providing a corresponding gate request to the user for execution by the user.

4. The communications control system of claim 1 wherein each request comprises:
an identification of the requesting user, and
an identification of another user to participate in the communication operation.

5. The communications control system of claim 1 wherein each control block comprises:
the identification of the requesting user,
the identification of the other user, and
an identification of the central processing system assigned to execute the communication connection.

6. The communications control system of claim 1, wherein:
each communication controller includes at least one network device connected to the communications network for performing the communication operations under control of the communication controller, the connection distribution data structure further includes
a directory of network devices in the processing system, the gate layer service means is further responsive to the request from the user for selecting and reading from the directory of network devices an identification of a currently available network device for performing the communication operation, each control block includes
the identification of the requesting user,
the identification of the other user,
the identification of the selected network device, and
an identification of the central processing system assigned to execute the communication connection, and the communication controller is responsive to the control block for directing the selected network device for performing the communication operation of the request.

7. The communications control system of claim 1, wherein each communication controller includes at least one network device connected to the communications network for performing the communication operations under control of the communication controller and the connection distribution data structure comprises:

a controller directory, containing
at least one connection count,
each connection count corresponding to a central processing system in the computer system and storing the present number of connections currently assigned to the corresponding central processing system, and at least one user directory pointer,
each user directory pointer corresponding to a user presently executing on the computer system and indicating the location in the shared memory of a corresponding user directory, at least one user directory,
each user directory containing at least one resource control table pointer,
each resource control table pointer corresponding to a communication controller and indicating the location in the shared memory of a corresponding resource control table, and at least one resource control table,
each resource control table corresponding to a network device, and
containing a transfer directory pointer,
the transfer directory pointer indicating the location in the shared memory of a corresponding transfer directory, the transfer directory,
corresponding to a communication connection being executed through the corresponding network device, and
containing at least one transfer table pointer indicating the location in the shared memory of a corresponding transfer table, at least one transfer table,
each transfer table containing
a central processing unit field,
the central processing unit field corresponding to a communication connection being executed through the network device and containing the identification of the central processing unit assigned to execute the communication connection, and
a transfer table count field for storing a number representing the number of control blocks currently being executed through the corresponding network device.

8. In a data processing system including a plurality of computer systems interconnected by a communications network, each computer system including a processing system having a plurality of central processing units and a shared memory, at least one user of the communications network executing on a central processing unit of the computer system and generating requests for communications operations with other users executing on other computer systems, and at least one communication controller connected to the communications network for forming communication connections between users, a communications control system for distributing execution of communication connections among the central processing units, comprising:

a connection distribution data structure for storing for each central processing unit a connection count representing the number of communication connections currently being executed by the corresponding central processing unit, and a gate driver interface service means resident as a single task resident in the shared memory and having an active invocation in a single central processing unit of the processing system, in each central processing unit having a user executing therein, a gate layer service means responsive to a request from the user for communicating the request to the present active invocation of the gate driver interface service means, the gate driver interface service means being responsive to each request received from the gate layer service means for selecting the central processing unit presently executing the least number of communication connections and assigning the communication connection to the selected central processing unit by constructing a corresponding control block, the control block containing the identification of the central processing unit assigned to execute the communication operation, and providing the control block to a communication controller, the communication controller being responsive to a control block for performing the requested communication operation and including in each communication controller, means responsive to a communication from a communication controller in another computer system for generating a corresponding interrupt output, and providing a corresponding control block to a central processing unit assigned to execute the corresponding communication operation, and in each central processing unit having a user executing therein, an interrupt handler responsive to a communication controller interrupt output and corresponding control block identifying the central processing unit as assigned to execute the corresponding communication operation for transferring the control block to an invocation of the gate layer service means on the assigned central processing unit, the gate layer service means being responsive to the control block for transmitting the communication to the local user.

9. The communications control system of claim 8, wherein:

each user is responsive to being initialized on the computer system for generating a request to receive requests from other computer systems directed to the user, the gate driver interface service means and the gate layer service means are responsive to the receive request for constructing a corresponding receive control block and providing the receive control block to the communication controller, each communication controller further is responsive to a request from a communication controller in another computer system for a communication operation with the user for generating a corresponding interrupt output and transmitting the corresponding receive control block to the central processing unit in which the presently active invocation of the gate layer service means is resident, and the interrupt handler in the central processing unit in which the presently active invocation of the gate layer service means resides is responsive to a receive control block for transferring the control block to the gate layer service means, the gate layer service means is responsive to the control block for selecting from the connection distribution data structure an identification of the central processing unit presently executing the least number of communication connections, assigning the communication connection to the selected central processing unit, and providing a corresponding gater request to the user for execution.

* * * * *